US007228730B2

(12) United States Patent
Haussner et al.

(10) Patent No.: US 7,228,730 B2
(45) Date of Patent: Jun. 12, 2007

(54) PRESSURE-MEASURING GLOW PLUG

(75) Inventors: Michael Haussner, Benningen (DE); Hans Houben, Wuerselen (DE); Frank Pechhold, Ludwigsburg (DE); Friedrich Mayr, Ostfildern (DE); Ulf Wyrwich, Pleidelsheim (DE)

(73) Assignees: Beru AG, Ludwigsburg (DE); Texas Instruments Holland B.V., EM Almelo (NL)

( * ) Notice: Subject to any disclaimer, the term of this patent is extended or adjusted under 35 U.S.C. 154(b) by 0 days.

(21) Appl. No.: 11/224,088

(22) Filed: Sep. 13, 2005

(65) Prior Publication Data

US 2006/0053875 A1 Mar. 16, 2006

(30) Foreign Application Priority Data

Sep. 15, 2004 (DE) ..................... 10 2004 044 727

(51) Int. Cl.
*G01M 15/00* (2006.01)

(52) U.S. Cl. .................................................... 73/119 R

(58) Field of Classification Search .................. 73/112, 73/115, 116, 117.2, 117.3, 118.1, 119 A, 73/119 R See application file for complete search history.

(56) References Cited

U.S. PATENT DOCUMENTS 4,271,859 A * 6/1981 Lawsing ...................... 137/85
4,273,150 A * 6/1981 Paduch et al. ................ 137/85
4,514,656 A * 4/1985 Damson et al. ............ 313/11.5
5,922,229 A 7/1999 Kurano
6,255,626 B1 7/2001 Endler et al.
6,411,038 B2 6/2002 Murai et al.
6,539,787 B1 4/2003 Murai et al.
6,649,875 B2 11/2003 Haussner et al.
2004/0182144 A1* 9/2004 Okazaki et al. ............ 73/118.1
2004/0182145 A1* 9/2004 Okazaki et al. ........... 73/119 R
2006/0137655 A1* 6/2006 Dordet ....................... 123/435

FOREIGN PATENT DOCUMENTS

DE 41 32 842 A1 4/1993
DE 196 80 912 T1 10/1997
DE 103 46 295 A1 4/2004

* cited by examiner

*Primary Examiner*—Eric S. McCall
(74) *Attorney, Agent, or Firm*—David S. Safran

(57) ABSTRACT

A pressure-measuring glow plug for a diesel engine with a plug body (3, 4) for insertion into a cylinder of the diesel engine, a heating rod (1) which is arranged in the plug body (3, 4), and a pressure sensor, which is arranged under an initial tension between the heating rod (1) and the plug body (3, 4), in such a way that the pressure sensor (7) is acted upon by the pressure prevailing in the combustion chamber of the cylinder. The heating rod (1) transmits the pressure in the combustion chamber of the cylinder to the pressure sensor (7) and is arranged so as to be displaceable in a sliding manner in the axial direction relative to the plug body (3, 4). A seal in the form of a bellows-shaped component (2) is provided between the heating rod (1) and the plug body (3, 4).

4 Claims, 2 Drawing Sheets

PRESSURE-MEASURING GLOW PLUG

BACKGROUND OF THE INVENTION

1. Field of Invention

The invention relates to a pressure-measuring glow plug for a diesel engine with a plug body for insertion into a cylinder of the diesel engine, a heating rod which is arranged in the plug body, and a pressure sensor, which is arranged under an initial tension between the heating rod and the plug body in such a way that the pressure sensor is acted upon by the pressure prevailing in the combustion chamber of the cylinder, whereby the heating rod transmits the pressure in the combustion chamber of the cylinder to the pressure sensor and in which the heating rod is arranged in the plug body so as to be displaceable in a sliding manner in the axial direction relative to the plug body, so that the pressure in the combustion chamber leads to an axial motion of the heating rod relative to the plug body, as a result of which motion the pressure sensor is acted upon by a force.

2. Description of Related Art

With a pressure-measuring or pressure gauge glow plug of the above mentioned type, the combustion pressure is transmitted directly via the heating rod to the pressure sensor, without the geometry and the strength of the plug body having an influence or being linked. All the usual functions of the glow plug are retained.

With such a pressure-measuring glow plug, sealing is preferably provided between the heating rod and the plug body. The seal is formed from a metal membrane or by an elastomer seal.

Use of metal membrane as a seal, however, has the drawback of a stiff spring characteristic and a small spring excursion, which leads to component loading. An elastomer seal, on the other hand, is temperature-sensitive.

SUMMARY OF THE INVENTION

According to the present invention, a seal in the form of a bellows-like component is provided between the heating rod and the plug body of the pressure-measuring glow plug of the type mentioned at the outset.

A bellows-like seal has the advantage that absolute tightness of the pressure-measuring glow plug is guaranteed in the region between heating rod and the plug body with respect to be prevailing combustion pressure.

The spring characteristic can moreover be influenced, i.e., selected in the desired manner, by the number and shape of the folds or layers of the bellows-like component.

As a result of the multi-layer structure of the bellows-like component, a small spring rate and the required pressure loading can be guaranteed.

A further advantage is that influences on the pressure sensor as a result of thermal loading during the glow operation or with different engine load states are minimal.

A particularly preferred example of an embodiment of the invention is described below in greater detail with the aid of the accompanying drawings.

DETAILED DESCRIPTION OF INVENTION

Figure 1:
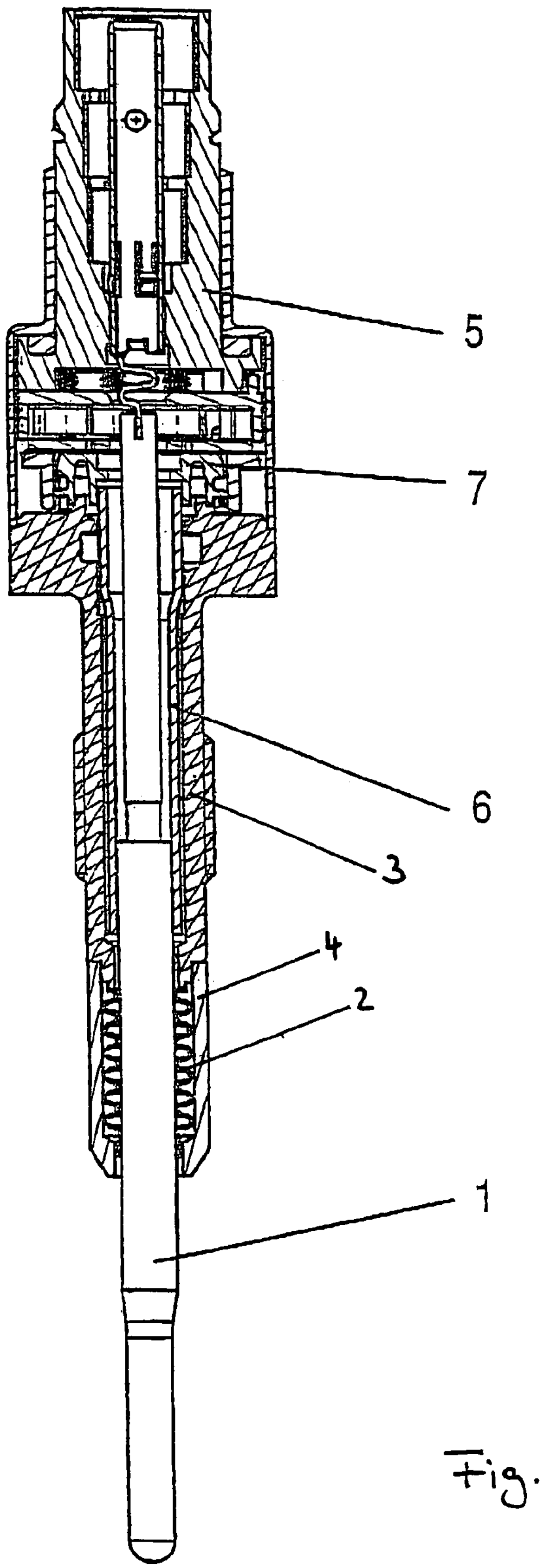
FIG. 1 is a sectional view of an embodiment of the pressure-measuring glow plug according to the invention for a diesel engine and FIG. 2 is an enlarged sectional view of the region of the pressure-measuring glow plug shown in FIG. 1 at which the bellows-like component is used as a seal.

As is shown in FIG. 1, a pressure-measuring glow plug for a diesel engine essentially comprises a plug body 3, 4, a heating rod 1 with a metallic or ceramic structure, which is arranged in the glow plug so as to be displaceable in a sliding manner in the axial direction relative to plug body 3, 4, a pressure sensor 7, which is arranged between heating rod 1 and plug body 3, 4, optionally, under an initial tension by means of a sensor unit 5 and is acted on by the pressure prevailing in the combustion chamber of the cylinder, whereby heating rod 1 transmits the pressure in the combustion chamber of the cylinder to pressure sensor 7.

Heating rod 1 is arranged so as to be displaceable in a sliding manner in the axial direction relative to plug body 3, 4, in such a way that the pressure in the combustion chamber leads to an axial motion of heating rod 1 relative to plug body 3, 4, and as a result of this axial motion, a force acts on pressure sensor 7.

Figure 2:
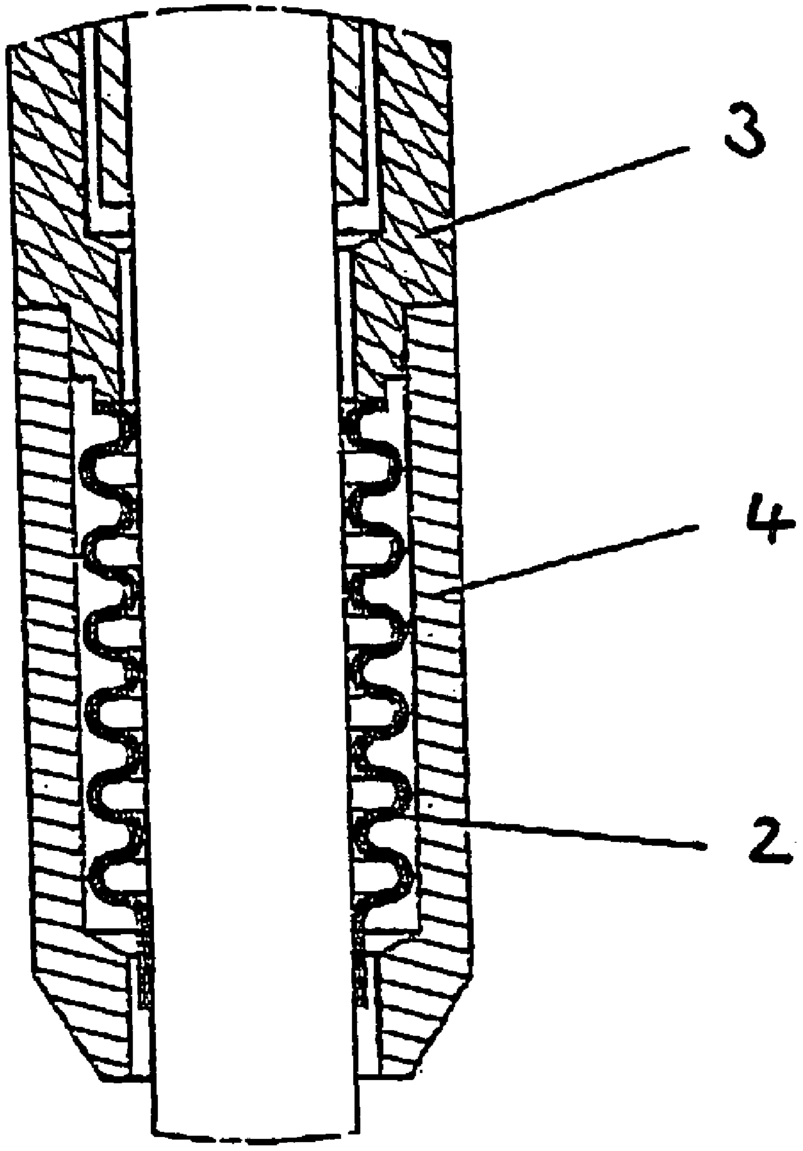

As is shown in FIG. 1, and in particular in FIG. 2, heating rod 1 is rigidly connected mechanically via an extension tube 6 to pressure sensor 7 and bellows 2, which is arranged as a sealing element between heating rod 1 and glow plug body 3, 4, and guarantee that heating rod 1 can move friction-free in the axial direction in plug body 3, 4.

As is shown in FIG. 2, bellows 2, which are preferably made from a metallic material, are connected mechanically to heating rod 1, for example, by means of the fact that a radially circumferential fillet weld is provided at the end face from the cylindrical part of bellows 2 to heating rod 1 or a radially circumferential through-weld is provided in the cylindrical part of bellows 2. The connection can be achieved in this region to the heating rod also by means of laser welding, crimping, swaging, soldering, press-fit etc.

In the example of embodiment shown in the figures, plug body 3, 4 comprises two parts, namely a body upper part 3 and a body lower part 4, which are connected together mechanically. Body lower part 4 is provided on the combustion-chamber side with a sealing cone, by means of which the glow plug seals off the combustion pressure at the cylinder head.

At the connection side, bellows 2 are connected mechanically to body upper part 3. At this point, too, bellows 2 can be designed with a cylindrical part, which is pushed onto the outside of the shaft of body upper part 3 and is connected mechanically thereto. Further connection possibilities are the same as with the connection of bellows 2 to heating rod 1.

As is shown in the drawing, the front sealing thus comprises a bellows-like component, which can be a metal bellows. The axial displaceability of heating rod 1 with, for the most part, linearity of the force path characteristic is thus guaranteed. Moreover, the heating rod 1 is thermally uncoupled from the plug body 3, 4 and the heating rod 1 is supported elastically via bellows 2 in plug body 3, 4. Furthermore, an initial tension can be exerted via bellows 2.

The pressure-measuring glow plug shown in the drawing works in the following manner:

As a result of the combustion pressure or the compressional pressure of the piston, heating rod 1 is displaced in the axial direction towards sensor element 7, which sits at the end of heating rod 1 on the connection side and is designed in the form of a piezosensor, a wire strain gauge or a similar measuring element. Due to this displacement, heating rod 1 presses with a certain force onto sensor element 7, as result of which a change in the force or tension present at the sensor element is brought about, which is processed by suitable evaluation electronics into a measurement signal.

The advantage of bellows 2 is that, due to a small spring characteristic, i.e., a small spring resistance with a large extension, the influence as a result of thermal loading on the sensor element can be kept very small. In the glow operation of the pressure-measuring glow plug, or more precisely with different load and speed ranges, heating rod 1 also continues to be heated between the two contact points at the sensor element and at the combustion-chamber seal, the effect of which would be that, with an excessively stiff combustion-chamber seal, an excessively large tension would be transmitted to the sensor element and a faulty measurement would therefore be the result. If the combustion-chamber seal is designed too stiff, i.e., an excessively high spring resistance with a small extension is present, no measurable change would occur at the sensor element and consequently no measurement signal would result.

Due to the design of the sealing in the form of a multilayer bellows, a small spring rate with a simultaneously adequate compressive loading is obtained. The effect of this is that better sealing with respect to the combustion pressure is achieved, that linearity in the measurement range is guaranteed on account of the small spring constant and the influence on the measurement signal is small, that the tensions as a result of the thermal influences on the sensor element are small, that the sealing is thermally non-sensitive and that the components used can be produced without problem.

What is claimed is:

1. A pressure-measuring glow plug for a diesel engine, comprising:

a plug body for insertion into a cylinder of a diesel engine, a heating rod which is displaceably arranged in the plug body so as to be slidable in an axial direction relative to the plug body, and a pressure sensor which is arranged between the heating rod and the plug body under an initial tension, and in such a way that the pressure sensor is acted upon, in use, by the pressure prevailing in the combustion chamber of the cylinder, whereby the heating rod transmits the pressure in the combustion chamber of the cylinder to the pressure sensor due to the pressure in the combustion chamber leading to an axial motion of the heating rod relative to the plug body so as to apply a force to the pressure sensor, wherein an airtight seal is form by a bellows-shaped component that is provided between the displacable heating rod and the plug body.

2. The pressure-measuring glow plug according to claim 1, wherein the bellows-shaped component is a multi-layer metal bellows.

3. The pressure-measuring glow plug according to claim 2, wherein the plug body comprises a upper body part and a lower body part, which are connected together mechanically, and wherein the bellows-shaped component is arranged in the lower body part and is connected at a connection-side end to the upper body part.

4. The pressure-measuring glow plug according to claim 1, wherein the plug body comprises a upper body part and a lower body part, which are connected together mechanically, and wherein the bellows-shaped component is arranged in the lower body part and is connected at a connection-side end to the upper body part.

* * * * *